April 25, 1950 H. E. CHURCHILL ET AL 2,505,171
TRANSMISSION
Filed Feb. 1, 1946 4 Sheets-Sheet 1

INVENTOR.
Harold E. Churchill, Paul V. Haigh + Harold O. Zander
BY
Brown, Jackson, Boettcher & Dienner
ATTORNEYS.

April 25, 1950     H. E. CHURCHILL ET AL     2,505,171
TRANSMISSION
Filed Feb. 1, 1946                                              4 Sheets-Sheet 3

INVENTOR.
Harold E. Churchill, Paul V. Haigh, Harold O. Zander
BY
ATTORNEYS

Patented Apr. 25, 1950

2,505,171

UNITED STATES PATENT OFFICE 2,505,171

TRANSMISSION

Harold E. Churchill, Paul V. Haigh, and Harold O. Zander, South Bend, Ind., assignors to The Studebaker Corporation, South Bend, Ind., a corporation of Delaware Application February 1, 1946, Serial No. 644,828

6 Claims. (Cl. 74—781)

Our present invention relates to improvements in transmissions, and more particularly to transmissions for automotive vehicles.

One of the main objects of our invention is to provide a transmission comprising a first planetary gear mechanism providing for a plurality of forward gear ratios together with a second planetary gear mechanism providing for reverse. Another object is to provide a transmission as aforesaid and comprising a torque converter in which the torque converter provides infinitely variable ratios between its limits with any of the gear ratios of the planetary gear mechanisms.

Another object is to provide a transmission as aforesaid having clutch means for preventing breaking of the drive or torque line through the transmission during shifting in effecting selection of a desired forward gear ratio.

A further object is to provide clutch and brake means for effecting selection of a desired gear ratio through the first or forward planetary gear mechanism with which a brake means such as a brake of the type known in the trade as an L. G. S. brake or a mechanical roller and co-operative cam member is arranged for preventing disconnection of the drive line in effecting a change of gear ratio through the first or forward planetary gear mechanism, and with means being associated with the foresaid brake means and operable with the brake and clutch means first mentioned providing a neutral for the transmission.

We propose to attain the aforesaid objects by providing a torque converter between the motive power source such as an internal combustion engine, and a forward planetary gear mechanism in which the driven element of the torque converter has connection with one of the elements of the planetary gear mechanism. Suitable clutch and brake means is associated with the planetary gear mechanism to effect direct or ratio drive therethrough to an intermediate driven shaft having connection with another of the elements of the planetary gear mechanism. The intermediate driven shaft also has connection with one element of a second or reverse planetary gear mechanism which is suitably arranged to provide reverse drive.

A preferred feature of our invention resides in the provision in a transmission as above described of an overrunning brake for preventing disconnection of the drive or torque line through the transmission in the actuation of the forward planetary gear mechanism providing for forward drive from one to the other of the forward gear ratios thereof.

A further preferred structural feature resides in providing a construction in which the forward planetary gear mechanism has one element thereof connected to the driven element of the torque converter with a second element of the planetary gear mechanism having connection with an intermediate driven shaft between the forward and reverse planetary gear mechanisms, with the third element of the forward planetary gear mechanism having connection with a hollow shaft extending coaxially of the intermediate driven shaft, and with which hollow shaft overrunning brake means is associated for preventing disconnection of the drive line upon actuation of the forward planetary gear mechanism in providing either of the two forward gear ratios therethrough.

A still further preferred feature resides in providing a stationary collar member having a sleeve portion which extends coaxially of the aforesaid hollow shaft to provide a cylindrical brake surface for the helical brake spring, and which collar member further serves to define in part a cylinder for a piston operable to effect the actuation of the clutch and brake means of the forward planetary gear mechanism.

A still further preferred feature lies in the construction of the collar member wherein it is provided with a substantially annular flange extending radially of the sleeve portion thereof and transversely of a housing means for the transmission, and which annular flange serves to provide for the formation therein and support of a cylinder and piston means to selectively affect conditioning of the helical brake spring for preventing braking of the drive or torque line through the forward planetary gear mechanism as above related.

A still further preferred feature resides in the construction of the housing means of the transmission by a pair of housing sections which together with the aforesaid collar member provides an annular cylinder for the reception of a piston associated with the clutch and brake means of the forward planetary gear mechanism, and in which the piston serves to divide the cylinder into a pair of chambers into which the selective admission of fluid under pressure causes actuation of the clutch and brake means to effect either one of the forward gear ratios of the forward planetary gear mechanism.

A still further preferred structural feature resides in providing the aforesaid collar member with clutch teeth adapted to be engaged by a shiftable brake and clutch sleeve associated with the reverse planetary gear mechanism to provide for reverse drive.

A further preferred structural feature resides in a construction in which the shiftable brake and clutch sleeve has connection with one element of the reverse planetary gear mechanism and in which the clutch sleeve is adapted to clutch two of the elements thereof together for forward drive through the transmission, and in which the clutch sleeve is adapted to have engagement with the clutch teeth of the aforesaid collar member to hold one of the elements of the reverse planetary gear mechanism stationary to effect reverse drive through the transmission.

A further preferred feature of the transmission hereinafter described in detail resides in the provision of a novel valve arrangement for controlling flow of fluid under pressure to a main control valve means for effecting the selective actuation of the transmission.

In the specific embodiment of our invention disclosed in detail hereinafter we have chosen for purposes of illustration a coil spring overrunning brake of the known L. G. S. type, but it will be readily apparent to those skilled in the art that other conventional forms of overrunning brakes may be used, such as the known roller and cam type, for example such as that shown and described in Patent No. 2,339,269, dated January 18, 1944, to William S. James.

Other objects and advantages of our invention will appear from the detail description.

Now, in order to acquaint those skilled in the art with the manner of constructing and utilizing a transmission in accordance with our invention we shall describe in connection with the accompanying drawings a preferred embodiment of our invention.

Figures 1, 2:
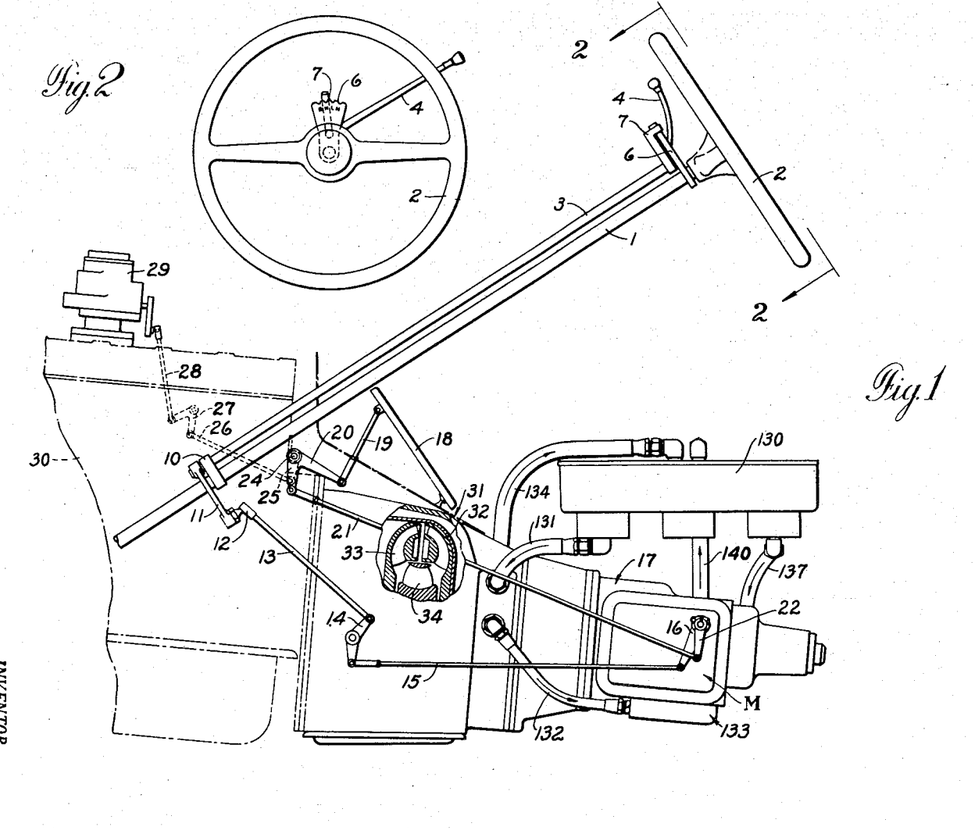
Figure 1 is a side elevational view of transmission means constructed in accordance with our invention and showing the general arrangement thereof with an internal combustion engine and steering apparatus of an automobile.
Figure 2 is a plan view of the steering wheel shown in Figure 1 taken on the line 2—2 of Figure 1 looking in the direction indicated by the arrows.

Referring now to Figures 1 and 2, there is shown a general arrangement of parts providing a power plant for a car or automobile comprising a standard steering column 1 having a steering wheel 2 at the upper end thereof with the lower end of the steering column 1 having connection in a known manner with the front wheels of the car or automobile for steering the same. A gear shift rod 3 extending lengthwise along the steering column 1 has a lever 4 secured to its upper end below the steering wheel 2 with the outer end of lever 4 projecting beyond the steering wheel in a position to be manipulated by the driver of the car or automobile for the selective actuation of the transmission to be described hereinafter. A panel member 6 is secured adjacent the upper end of the steering post 1 in a position to be visible through the steering wheel 2, and which panel member, on its upper face, as shown in Figure 2, bears the letters R H L N, reading from left to right. An arm 7 of lever 4 has its outer end extending upwardly beyond the outer upper edge of the panel 6 and upon manipulation of the lever 4 may be brought into alignment with the letters on panel 6 which manipulation effects actuation of the transmission corresponding to the letter with which the arm 7 is aligned. It will be understood that the letter R indicates reverse, the letter H—high, the letter L—low, and the letter N—neutral, with the high and low of course meaning the two forward gear ratios of the transmission.

The shift rod 3 adjacent its lower end is journaled in a bracket 10 fixed to the steering column 1, and at its lower end is connected to a crank arm 11, the other end of which has connection with one end of a rod 13 through a ball and socket means 12. The other end of rod 13 is pivotally connected to one arm of a bell crank lever 14, and a rod 15 extends from the other arm of the bell crank 14 to a shift lever 16 which has connection with a lever associated with a central valve means M for the transmission 17. The control valve means M forms no part of the present invention and reference may be had to the copending application of Woodrow A. Hasbany, Serial No. 652,860, filed March 8, 1946, for a description thereof.

A throttle or accelerator pedal 18 has connection by means of a rod 19 with one arm of a bell crank 20, with the other arm of the bell crank 20 being connected by a rod 21 to a throttle lever 22, the function of which is described in the application last referred to and which as previously noted forms no part of our present invention. The bell crank 20 is fixed to a shaft 24 which carries a second lever arm 25 having pivotal connection with one end of a rod 26 the other end of which is pivotally connected to one arm of a bell crank 27. The other arm of the bell crank 27 is pivotally connected to one end of a rod 28 the other end of which through ball and socket means is connected to the valve means of a carbureter 29 for controlling the speed of the internal combustion engine partially shown in broken lines at 30.

A fluid torque converting unit of known construction, such as a torque converter 31, comprising an impeller or driving member 32, a rotor or driven member 33 and a stator or reaction member 34 is mounted rearwardly of the internal combustion engine 30 in a known manner with the impeller 32 of the torque converter having connection with the crankshaft of the internal combustion engine. The driven member or rotor 33 of the torque converter 31, is connected to the drive shaft 40 of the transmission 17 shown in detail in Figure 3, to which reference may now be had.

Figures 3, 10:
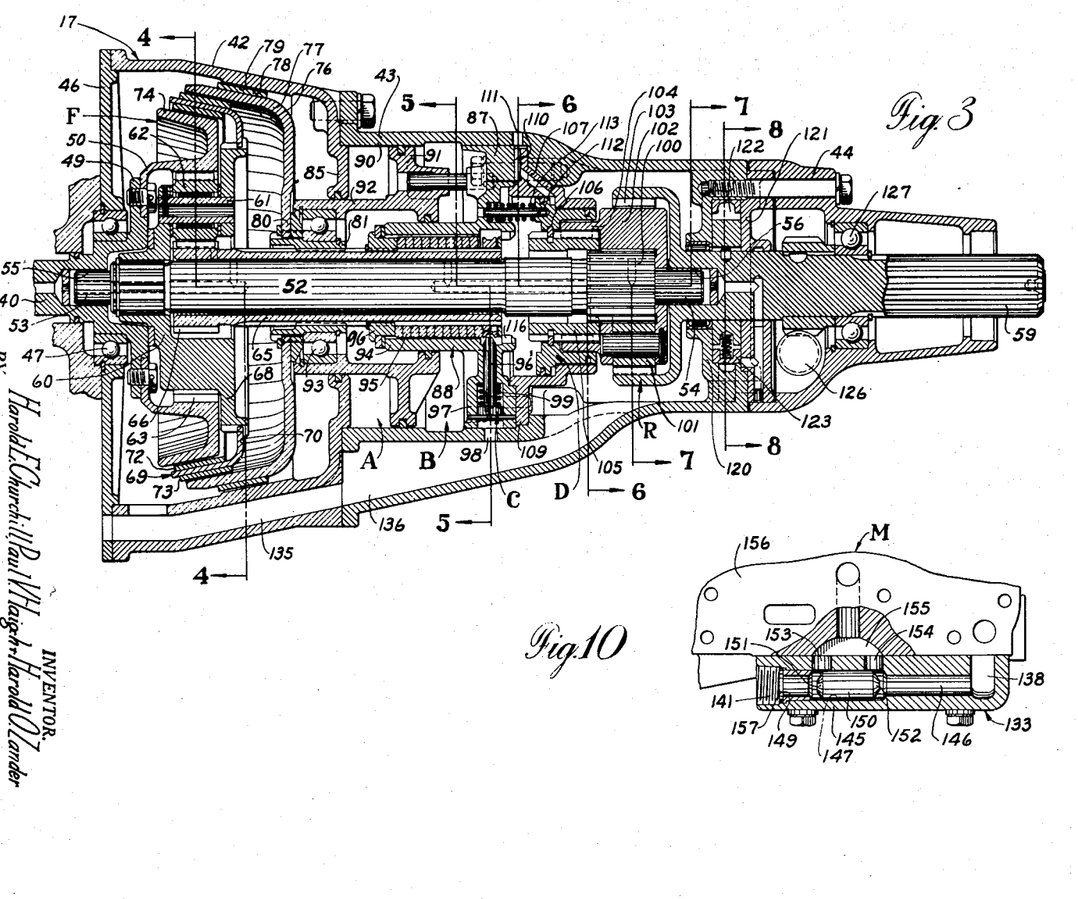
Figure 3 is a sectional view through the vertical longitudinal medial plane of the transmission of our invention, which transmission provides for two forward gear ratios hereinafter referred to as high and low, and one reverse gear ratio.
Figure 10 is a detail sectional view of a valve arrangement for controlling flow of fluid under pressure from either of one or both of two pumps to a control valve means for effecting control of the transmission of our invention.
Figure 4:
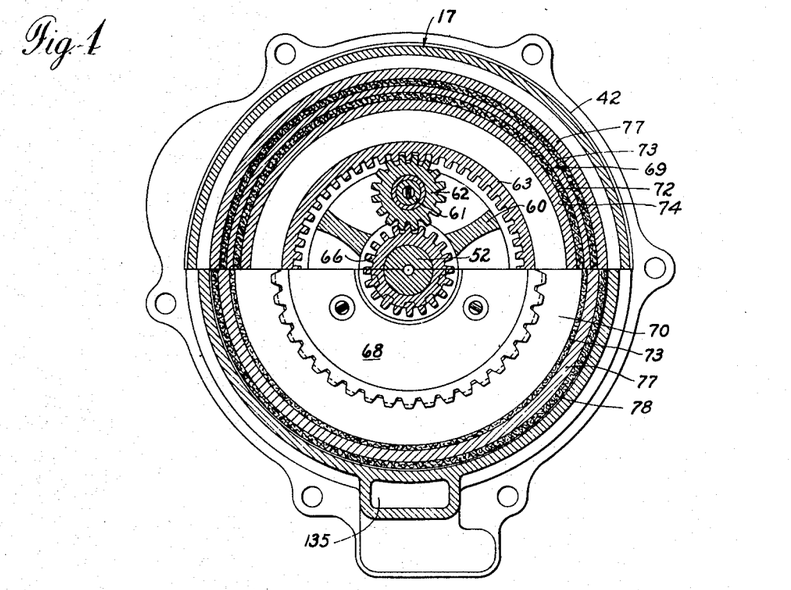
Figure 4 is a vertical sectional view taken substantially on line 4—4 of Figure 3 looking in the direction indicated by the arrows.
Figure 5:
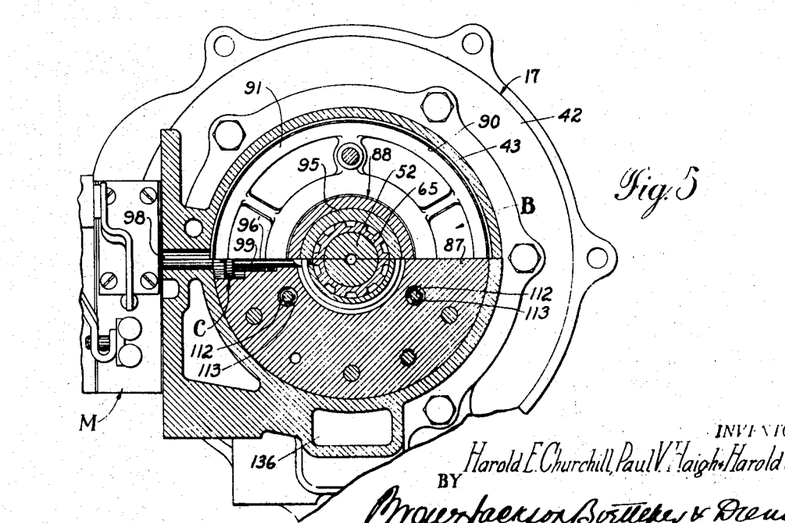
Figure 5 is a vertical sectional view taken substantially on the line 5—5 of Figure 3 looking in the direction indicated by the arrows.
Figure 6:
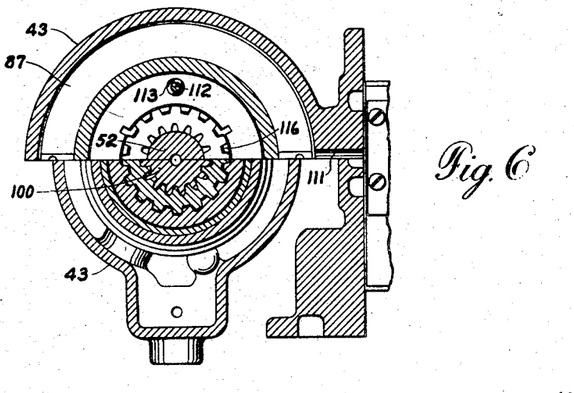
Figure 6 is a vertical sectional view taken substantially on the line 6—6 of Figure 3 looking in the direction indicated by the arrows.
Figure 7:
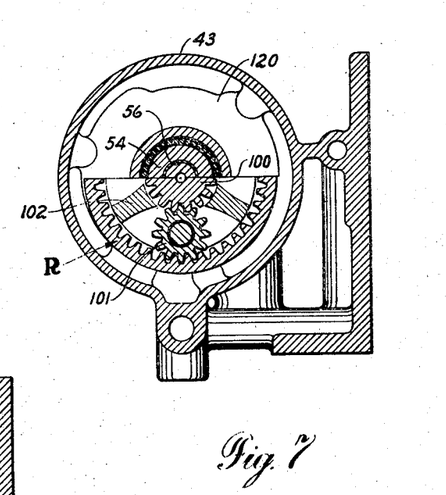
Figure 7 is a vertical sectional view taken substantially on the line 7—7 of Figure 3 looking in the direction indicated by the arrows.
Figure 8:
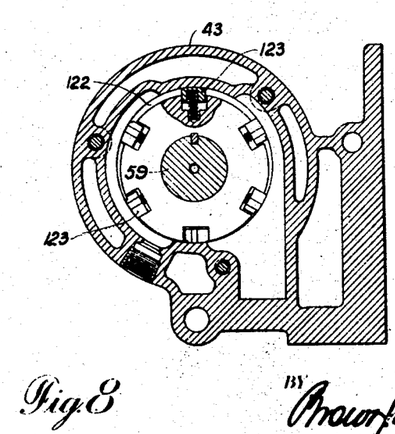
Figure 8 is a detail vertical sectional view taken substantially on the line 8—8 of Figure 3 looking in the direction indicated by the arrows.
Figure 9:
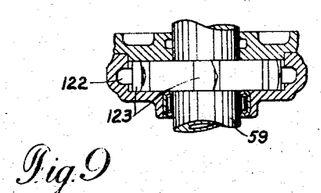
Figure 9 is a plan view of the rotor of the pump shown in Figure 8, with a portion of the casing for the pump being shown in section.

As previously mentioned the transmission 17 is of a character providing two forward gear ratios and one reverse gear ratio and, in the embodiment shown, comprises a first housing section 42 enclosing a first or forward drive planetary gear mechanism F, an intermediate housing section 43 suitably bolted to the housing section 42 and enclosing a reverse planetary gear mechanism R, and a tail shaft housing section 44 secured, as by a plurality of bolts, to the rearward end of the intermediate housing section 43. As shown, the rearward end of the drive shaft 40 extends through an opening formed in an end wall closure plate 46 of the forward end of the transmission housing section 42, and is journaled for rotation in the end wall in a ball-bearing means 47. The rearward end of the drive shaft 40 is provided with a radially outwardly extending flange 49 to which a ring gear member 50 of the planetary gear mechanism F is suitably bolted. An intermediate driven shaft 52 is provided at its opposite ends with reduced forward and rearward cylindrical portions 53 and 54 which are journaled respectively, in a bore 55 in the drive shaft 40 and in a bearing sleeve supported in a bore 56 in the forward end of a tail shaft 59, which tail shaft constitutes the driven shaft of the transmission and which has connection with the propeller shaft (not shown) of an automobile. The planetary gear mechanism F comprises a planet carrier means 60 having splined connection with the intermediate driven shaft 52 adjacent the forward end thereof, and which planet carrier means 60 is provided with a plurality of horizontally extending studs 61, only one of which is shown, for rotatably supporting a plurality of planet pinions 62 (only one being shown) having meshing engagement with the internal teeth of the ring gear 63 of the ring gear member 50. A hollow sun gear shaft 65 extends coaxially of the intermediate driven shaft 52, and at its forward end is formed with an integral sun gear 66 having meshing engagement with the planet pinions 62 to complete the planetary gear mechanism shown at F.

The planet carrier means 60, at its rearward end, is formed with a radial flange 68 which provides for the support of a first torque transmitting means 69 and for movement of the same axially of the transmission, as by means of the splined connection between the inwardly extending annular flange 70 of the torque transmitting member 69 with the flange 68 of the planet member 60. The torque transmitting member 69 carries internal and external friction cone clutch elements 72 and 73, respectively, which are adapted to have engagement selectively with the external cone clutch surface 74 of the ring gear member 50, and the internal cone clutch surface 76 of a second torque transmitting member 77 respectively. The outer surface of the second torque transmitting member 77 is provided with a cone brake element 78 of friction material for engagement with the conical brake surface 79 of the housing section 42. The second torque transmitting member 77 is of cup-shape, and the radially inwardly extending annular flange 80 thereof has splined connection with one end of a collar 81 having splined connection with an intermediate portion of the sun gear shaft 65 for movement axially thereof. The rearward end of the housing section 42 is provided with a radially inwardly extending annular flange 85 forming a rear end wall therefor which, together with the intermediate housing section 43 and a sleeve member 88 extending coaxially of and spaced from sun gear shaft 65 and which sleeve member 88 at its rearward end is formed with an enlarged radially extending annular flange 87 extending transversely of housing section 43 substantially centrally thereof, form an axially extending annular cylinder 90 in which a piston 91 is adapted to be reciprocated. The piston 91 comprises a forwardly extending sleeve portion 92 and between the forward end of which and the collar member 81 a ball-bearing assembly 93 is arranged to provide for rotation of the second torque transmitting member 77 with the sun gear shaft 65. It will be observed that the cylinder 90 comprises a pair of pressure chambers A and B one at either side of piston 91 in which, as viewed in the drawing, admission of fluid under pressure into chamber A is effective to cause movement of the piston 91 to the right, and which, by the connection thereof with the sleeve member 81 splined to the sun gear shaft 64 effects movement of the second torque transmitting member 77 to the right to engage the cone brake surface 78 thereof with the brake surface 79 of the housing section 42 to hold the sun gear shaft 65 and the sun gear 66 thereof against rotation. In this position of the parts the planet carrier means 60 is caused to be driven by the drive shaft 40 through the ring gear 63 to drive the planet pinions 62 and the planet pinion carrier means 60 which is splined to the intermediate driven shaft 52 to effect ratio drive between the drive shaft 40 and the intermediate driven shaft 52. Upon admission of fluid under pressure into the chamber B, the piston 91 as viewed in the drawing, is shifted to the left together with the second torque transmitting member 77 to engage the internal conical surface thereof with the external cone clutch surface 73 of the first torque transmitting member 70, which causes axial movement of the first torque transmitting member to the left, as viewed in Figure 3, to engage the internal cone clutch surface 72 thereof with the clutch surface 74 of the ring gear member 50, which thereby locks the sun gear 66 to the ring gear member 50 to provide for direct drive from the drive shaft 40 to the intermediate driven shaft 52. It will be observed that the area of piston 91 against which pressure in chamber B is adapted to act is of greater cross-sectional area that the area of the piston 91 against which pressure in chamber A is adapted to act. This arrangement of the effective areas of the piston for the two chambers A and B is for the purpose of providing greater clutching force when the pair of torque transmitting members are clutched to effect direct drive through the transmission and with lesser clutching force when the torque transmitting member 77 is locked to the case for ratio drive with a common source of fluid under pressure for effecting the selective admission of such fluid to either of the chambers A and B. It will be observed from the above that the first and second torque transmitting members 70 and 77 provide a combination brake and clutch means for effecting either direct or ratio drive through the planetary gear mechanism F.

A coil spring brake 95 of the known L. G. S.

type extends coaxially of the sun gear shaft 65 and at its forward end is secured to a ring member 96 having splined connection with the sun gear shaft 65. It will be seen that the coil spring brake 95 lies between the sun gear shaft 65 and the axially extending sleeve 94 of collar member 88 in which the inner cylindrical surface of the sleeve 88 serves as a brake surface for the coil spring. A piston and cylinder means shown at C is arranged in an enlarged boss portion 97 of the flange 87 of the collar member 88. Upon admission of fluid under pressure through the port 98 formed in the housing 43 into the cylinder in boss 97, the piston 96' is moved radially inwardly against the force of the coil spring 99 disposed between the enlarged outer end of piston 96' and the base of the bore forming the cylinder in the boss 97 to engage the inwardly extending reduced rod-like extension of piston 96' with the free end of a ring fixed to the free end of the coil spring 95 to condition the latter for actuation. Thus when piston 96' is caused to be moved radially inwardly, as by admission of fluid under pressure through the port 98, the coil spring brake 95 becomes an overrunning brake and its function is to take the reaction of the sun gear 66 during the transition of shifting of the torque transmitting member 77 and the intermediate torque transmitting member 69 when these latter members are shifted to effect a transition of ratio drive to direct drive or vice versa between the drive shaft 40 and the intermediate driven shaft 52. Thus, when the piston 91 is energized, a shift in gear ratio between the drive shaft 40 and the intermediate driven shaft 52 may be made without breaking the drive line. The function of the coil spring brake 95 is overlapping and requires no timing with any shift taking place.

The rearward end of the intermediate driven shaft 52 adjacent the reduced cylindrical portion 54 is formed with a sun gear 100 which has meshing engagement with planet pinions 101 (only one being shown) carried by the planet carrier member 102 and which planet pinions 101 having meshing engagement with the teeth of an internal ring gear 103 formed integral with the tail or driven shaft 59. The planet carrier member 102 is formed with an annular flange 104 extending forwardly of the transmission which is provided with internal clutch teeth having sliding engagement with the external clutch teeth of a jaw clutch sleeve 105 which is mounted for movement axially of the intermediate driven shaft 52 with a piston shown at D by a snap ring 106. The sleeve 105, at its rearward end, is provided with internal clutch teeth adapted to have engagement in the position shown in Figure 3 of the drawings with the teeth of the sun gear 100. It will be observed with the parts in the position shown in Figure 3 that the sun gear 100 is locked to the planet carrier 101 through the sleeve 105 to provide a direct driving connection between the intermediate driven shaft 52 and the tail or driven shaft 59. The piston D is mounted for axial movement in a cylinder forming member 107 having a radially outwardly extending flange 109 which is suitably secured in the housing 43 between an internal shoulder thereof and the flange 87 of the sleeve member 88. The cylinder forming member 107 is provided with a suitable groove which together with a portion of the flange 87 forms a duct 110 having communication with the port 111 in the wall of housing section 43 for admitting fluid under pressure for shifting the piston D. A pin 112 is fitted in the forward end of the piston D for movement therewith, and a spring 113, disposed about the pin 112, seats against the forward end of piston D with its opposite end seating in a recess formed in the enlarged radial flange 87 of the sleeve member 88. Upon admission of fluid under pressure through the port 111 into the duct 110, the piston D is caused to be moved axially to the left as viewed in Figure 3, which movement of the piston carries with it the sleeve member 105 to disengage the internal clutch teeth thereof from the teeth of the sun gear 100. This movement of the piston D breaks the drive line between the intermediate driven shaft 52 and the driven or tail shaft 59. Further continued shifting movement of the piston D to the left effects engagement of the external brake teeth thereof with the internal brake teeth 116 formed at the rearward end of the sleeve 88 to hold the sleeve 105 against rotation. The member 105 is of suitable length to maintain engagement with the internal teeth of the annular sleeve of the planet carrier 102, so that upon movement of the piston D to the position last referred to, the planet carrier 102 is held against rotation, whereby the planetary unit R is effective to establish rotation of the driven or tail shaft 59 in a direction opposite the direction of rotation of the intermediate driven shaft 52 to provide a reverse for the transmission. The proportioning of the parts is such that, movement of the sleeve 105 to the left by movement of piston D, is effective to first release the lock up between the sun gear 100 and the planet carrier 102 before the external brake teeth of sleeve 105 engage the internal brake teeth 116 at the rearward end of sleeve 88 to effect lock up of the planet carrier 102 with the housing section 43 of the transmission to drive the driven or tail shaft 59 in reverse.

The rearward end of the housing section 43 is provided with an end wall 120 through which the driven shaft 59 extends and which, together with an end wall 121 secured to the tail shaft housing section 44, provides a pump chamber 122 for a rotor pump shown at 123. The rotor pump 123 is of known construction and is adapted to be driven upon rotation of the tail shaft or driven shaft 59 in the forward direction to deliver fluid under pressure for effecting actuation of the transmission in the manner described in the aforesaid copending application. Also a conventional speedometer gear arrangement 126 is associated with the tail or driven shaft 59 and it forms no part of our present invention. A ball bearing assembly 127 supported within the tail shaft housing section 44, provides for rotatably supporting the driven or tail shaft 59.

The operation of the transmission is as follows:

Upon admission of fluid under pressure to chamber A through a suitable port (not shown) formed in the transmission casing in a known manner with the chamber B being exhausted through a suitable port (not shown) which like the port for chamber A is formed in a known manner in the transmission casing, the piston 92 will be moved to the right as viewed in Figure 3 to lock the torque transmitting member 77 to the case which is effective to hold the sun gear 66 of the planetary unit F against rotation to provide ratio drive between the drive shaft 40 and the intermediate driven shaft 52. Under these conditions the ring gear is the driver and receives its driving torque from the rotor or pump member 33 of the torque converter 31 positioned ahead of it. When the chamber B has fluid under pressure admitted thereto, with the chamber A being exhausted, the torque transmitting members 77 and 69 frictionally lock the ring gear of planetary unit F with the sun gear 66, causing the planetary unit F to revolve as a unit with no reduction therethrough. When the piston 96' is caused to be moved inwardly, as by admission of fluid under pressure through the duct 98 into the cylinder for the piston 96' the collar of the free end of the coil spring 95 is engaged so that the coil spring 95 is conditioned to act as an overrunning brake or what is sometimes referred to as a one-way brake. Its prime function is to take the reaction of the sun gear 66 during the transition of shifting from direct to ratio drive, or from ratio to direct drive, through the planetary gear mechanism F. The coil spring brake 95 thus allows the shift to take place without breaking the drive line between the drive shaft 40 and the intermediate driven shaft 52, and it requires no timing with any shift from direct to ratio drive, or ratio to direct drive, in the planetary gear unit F. Neutral for the transmission is obtained by bleeding the cylinder in which the piston 96' is disposed, which then allows the coil spring brake 95 to rotate freely in either direction which, together with the bleeding of both chambers A and B, permits the torque transmitting members 77 and 69 to float. This permits the sun gear 66 to rotate in either direction, causing a break in the drive line between the drive shaft 40 and the intermediate driven shaft 52, and thus providing a neutral for the transmission.

Also as previously related, the piston D provides for effecting reverse drive through the transmission, and when the cylinder in which the piston operates is devoid of pressure the sping 113, surrounding the pin 112, secured in the forward end of the piston, locks the sun gear 100 with the planet carrier 102 to establish a direct drive connection in the forward direction between the intermediate driven shaft 52 and the tail or driven shaft 59. Upon admission of fluid under pressure into the cylinder in which the piston D operates, the sleeve member 105, which in effect forms one element of a jaw clutch is first disengaged from the sun gear 100 and then subsequently is effective to lock the planet carrier 102 to housing section 43 through the collar member 88 to establish reverse driving connection between the intermediate driven shaft 52 and the tail or driven shaft 59.

Referring again to Figure 1 it will be seen that a reservoir 130 containing oil for effecting operation of the control valve means M is disposed above the transmission 17. A conduit 131 extends from the reservoir 130 to a pump means (not shown) disposed within the torque converter case for delivering fluid under pressure through a conduit 132 to a valve housing 133, shown in detail in Figure 10, of the valve means M. The housing sections 42 and 43, as shown in Figure 3, are provided with sump or oil collecting portions 135 and 136 respectively, with the oil or fluid collected in the sump portions 133 and 135 being adapted to be returned to the reservoir 130 through the conduit 134 by the pump means within the torque converter case. The incorporation of such pump means with a torque converter as above described is a known expedient in the art and it is believed that the above description will suffice for purposes of describing the valve means shown at 133 in Figure 10. It will also be observed that a conduit 137 extends from the reservoir and this conduit is adapted to deliver oil from the reservoir 130 to the pump chamber 122 of the transmission. The fluid delivered under pressure from the chamber 122 by the rotor pump, shown at 125 is adapted to be delivered to a fluid passageway 138 shown in Figure 10. A relief valve (not shown) is associated with the rotor pump 122 ahead of passageway 138 so that under certain conditions of operation of the fluid under pressure developed by the pump 122 is adapted to be returned to the reservoir 130 through a conduit 140.

Referring now particularly to Figure 10 fluid from the conduit 132 shown in Figure 1 is adapted to be delivered to a tapped port 141 formed in one end of the valve housing 145 of the valve means 133 with which the connection fixed to the discharge end of the conduit 132 has threaded engagement. Also, fluid under pressure is adapted to be delivered to the conduit or passage at 138 at the other end of the housing 145 of the valve means 133 by the pump 122. The fluid passageway 138 has communication with a bore 146 which opens into an enlarged valve receiving bore or chamber 147 and which bore at its opposite end has a sleeve 149 fixed adjacent the tapped opening 141. A cylindrical valve member 150 is slidingly supported within the valve receiving bore or chamber 147 and is provided with tapered valve portions 151 and 152 at its opposite ends. A pair of ports 153 and 154 establish communication adjacent opposite ends of the valve chamber 147 with a passageway 155 of a block member 156 of the fluid control valve means M. In the arrangement above, delivery of fluid under pressure through the tapped opening 141 from the conduit 132 shifts the cylindrical valve 150 to the right, as viewed in the drawing, to seat the valve portion 152 thereof on the valve seat formed at the intersection of the bore 146 with the valve chamber or bore 147 which provides for admission of the fluid under pressure thru the port 153 into the chamber 155. Assuming that the torque converter is not in operation but the car with which the transmission is assembled is being pushed forward so that the rotor pump 125 is being operated, it will be seen that fluid under pressure will be delivered to the passageway 138, and will enter the bore or valve chamber 147 causing the cylindrical valve 150 to shift to the left, as viewed in the drawing, to seat the valve portion 151 thereof upon the seat formed at the inner end of sleeve 149 fixed in the end of the bore 157 adjacent the tapped opening 141 and effecting the delivery of fluid under pressure through the port 154 into the passageway 155. If the fluid pressure is being delivered to the valve housing means 133 through both the conduit 132 and through the passageway 138 the valve will assume the intermediate position shown in the drawing, providing of course the pressure of the fluid being delivered from opposite ends of the valve is of substantially equal pressure which effects delivery of fluid under pressure from both sources through the ports 153 and 154 to the chamber 155. The arrangement of the valve housing means 133 is such that with the internal combustion engine running the pump means driven by the torque converter is delivering fluid under pressure to the hydraulic control means M or if the motor is dead and the car is being pushed fluid under pressure will be delivered to the passageway 138 to the control means as shown at M to effect actuation of the transmission which control means M as above related is disclosed in detail in the copending application of Woodrow A. Hasbany. The valve means as shown at 133 has utility for various forms of hydraulic control mechanism such as indicated generally at M for controlling admission of fluid under pressure from one or two sources to a suitable fluid controlled valve means.

While we have shown what we consider to be the preferred embodiment of our invention it will be understood that various modifications and rearrangements may be made therein without departing from the spirit and scope of our invention.

We claim:

1. In a transmission, a transmission housing, a planetary gear mechanism disposed within said housing and comprising three elements, namely, a sun gear, a ring gear, and planet pinion means between said sun and ring gears, a drive shaft connected to one of said elements, a driven shaft connected to a second of said elements, a hollow shaft extending coaxially of said driven shaft and connected to the third of said elements, torque transmitting means within said housing and shiftable axially of said hollow shaft for locking up said planetary gear mechanism to effect direct drive therethrough, or for engaging one of said elements with said transmission housing to effect ratio drive through said planetary gear mechanism, a collar member having a sleeve portion extending coaxially of and spaced from said hollow shaft and having an annular flange extending radially of said sleeve portion transversely of said transmission housing, coil spring brake means disposed between said hollow shaft and said sleeve portion and having one end thereof fixed to said hollow shaft, piston and cylinder means in said annular flange of said collar member with said piston being adapted to be selectively engaged with the other end of said coil spring brake means for preventing breaking of the drive line between said drive and driven shafts upon actuation of said torque transmitting means for selectively effecting actuation of said planetary gear mechanism to effect direct drive and ratio drive therethrough, or vice versa.

2. In a transmission, a transmission housing comprising a pair of housing sections joined together end to end and having a radially inwardly extending flange between the joined ends thereof, a planetary gear mechanism disposed within one of said housing sections and comprising three elements, namely, a sun gear, a ring gear and planet pinion means between said sun and ring gears, a drive shaft connected to one of said elements, a driven shaft connected to a second of said elements and extending into said second housing section, a hollow shaft extending coaxially of said driven shaft connected to a third of said elements and extending into said second housing section, torque transmitting means disposed within said first housing section for selectively locking up said planetary gear mechanism to effect direct drive from said drive shaft to said driven shaft therethrough, or for holding one of said elements against rotation to effect ratio drive from said drive shaft to said driven shaft through said planetary gear mechanism, a collar member fixed in said second housing section and having a sleeve portion extending coaxially of said hollow shaft and an annular flange extending radially from said sleeve portion and transversely of said second housing section, a piston connected to said torque transmitting means and comprising a sleeve portion extending coaxially of said sleeve portion of said collar member and through the radially extending flange between said first and second housing sections, said second housing section, said inwardly extending flange, said collar member and said piston together with the sleeve portion thereof defining a pair of pressure chambers to either side of said piston for reciprocating the same axially of said transmission for effecting actuation of said planetary gear mechanism for direct or ratio drive therethrough.

3. In a transmission, a transmission housing comprising a pair of housing sections joined together end to end and having a radially inwardly extending flange between the joined ends thereof, a planetary gear mechanism disposed within one of said housing sections and comprising three elements, namely, a sun gear, a ring gear, and planet pinion means between said sun and ring gears, a drive shaft connected to one of said elements, a driven shaft connected to a second of said elements and extending into said second housing section, a hollow shaft extending coaxially of said driven shaft connected to the third of said elements and extending into said second housing section, torque transmitting means disposed within said first housing section for selectively locking up said planetary gear mechanism to effect direct drive from said drive shaft to said driven shaft therethrough, or for holding one of said elements against rotation to effect ratio drive from said drive to said driven shaft through said planetary gear mechanism, a collar member fixed in said second housing section and having a sleeve portion extending coaxially of and spaced from said hollow shaft to define an annular recess therebetween and an annular flange extending radially from said sleeve portion and transversely of said second housing section, an overrunning brake means disposed in said annular recess and fixed at one end to said hollow shaft, a piston connected to said torque transmitting means and comprising a sleeve portion extending coaxially of said sleeve portion of said collar member and through the radially extending flange between said first and second housing sections, said second housing section, said inwardly extending flange between said housing sections, said collar member and said piston together with the sleeve portion thereof defining a pair of pressure chambers to either side of said piston for reciprocating the same axially of said transmission for effecting actuation of said planetary gear mechanism for direct or ratio drive therethrough, and piston and cylinder means disposed in said annular flange of said collar member, said piston being adapted to be engaged with the other end of said overrunning brake means for preventing breaking of the drive line between said drive and driven shafts upon actuation of said torque transmitting means for actuating said planetary gear mechanism in effecting direct or ratio drive, or vice versa therethrough.

4. A transmission comprising a transmission housing, a drive shaft and a driven shaft, a first gear set between said drive and driven shafts for establishing two different ratio drives in one direction between said shaft, means associated with said first gear set for selectively effecting either of said gear ratios of drive between said drive and driven shafts, said last named means including a piston having a sleeve portion extending axially of said shaft, a collar member fixed in said transmission housing having a sleeve portion extending axially of said driven shaft and disposed radially inwardly of the sleeve portion of said piston, said collar member having an annular flange extending radially outwardly thereof and transversely of said transmission housing, said housing, said collar member and said piston together with the sleeve portion thereof defining a pressure chamber at either side of said piston, and said pressure chambers being adapted to have fluid under pressure selectively admitted thereto to effect the selective actuation of said first gear set, brake means disposed within said sleeve portion of said collar member and having connection with a member of said first gear set, said brake means when engaged being operative to act as a one-way brake for taking the reaction of said first gear set for preventing breaking of the drive line between said drive and driven shafts in the actuation of said means for selectively effecting actuation of the first gear set from one to the other of the gear ratios thereof.

5. A transmission comprising a transmission housing, a drive shaft and a driven shaft, a first gear set between said drive and driven shafts for establishing two different ratio drives in one direction between said shafts, means associated with said first gear set for selectively effecting either of said gear ratios of drive between said drive and driven shafts, said last named means including a piston having a sleeve portion extending axially of said shaft, a collar member fixed in said transmission housing having a sleeve portion extending axially of said driven shaft and disposed radially inwardly of the sleeve portion of said piston, said collar member having an annular flange extending radially outwardly thereof and transversely of said transmission housing, said housing, said collar member and said piston together with the sleeve portion thereof defining a pressure chamber at either side of said piston, and said pressure chambers being adapted to have fluid under pressure selectively admitted thereto to effect the selective actuation of said first gear set, brake means disposed within said sleeve portion of said collar member and having connection with a member of said first gear set, said brake means when engaged being operative to act as a one-way brake for taking the reaction of said first gear set for preventing breaking of the drive line between said drive and driven shafts in the actuation of said means for selectively effecting actuation of the first gear set from one to the other of the gear ratios thereof, and a piston movable radially in a cylinder formed in the annular flange of said collar member for selectively rendering said brake means operative and inoperative.

6. A transmission comprising a transmission housing, a drive shaft and a driven shaft, a first gear set between said drive and driven shafts for establishing two different ratio drives in one direction between said shafts, means associated with said first gear set for selectively effecting either of said gear ratios of drive between said drive and driven shafts, said last named means including a piston having a sleeve portion extending axially of said shaft, a collar member fixed in said transmission housing having a sleeve portion extending axially of said driven shaft and disposed radially inwardly of the sleeve portion of said piston, said collar member having an annular flange extending radially outwardly thereof and transversely of said transmission housing, said housing, said collar member and said piston together with the sleeve portion thereof defining a pressure chamber at either side of said piston, and said pressure chambers being adapted to have fluid under pressure selectively admitted thereto to effect the selective actuation of said first gear set, brake means disposed within said sleeve portion of said collar member and having connection with a member of said first gear set, said brake means being operative to act as a one-way brake for taking the reaction of said first gear set for preventing breaking of the drive line between said drive and driven shafts in the actuation of said means for selectively effecting actuation of the first gear set from one to the other of the gear ratios thereof, a second driven shaft, a second gear set between said first driven shaft and said second driven shaft, and clutch and brake means associated with said second gear set including a shiftable collar having clutch teeth and brake teeth, said first driven shaft having clutch teeth adapted to be engaged by the clutch teeth of said shiftable collar for effecting rotation of said second driven shaft in the same direction as said first driven shaft, said collar member having brake teeth, and said shiftable collar being movable to engage the brake teeth thereof with said brake teeth of said collar member with said shiftable collar in its latter position having the clutch teeth thereof disengaged from the clutch teeth of said first driven shaft to effect driving of said second driven shaft in a reverse direction of said first driven shaft through said second gear set.

HAROLD E. CHURCHILL.
PAUL V. HAIGH.
HAROLD O. ZANDER.

REFERENCES CITED

The following references are of record in the file of this patent:

UNITED STATES PATENTS

| Number | Name | Date |
|---|---|---|
| 1,686,310 | Beebe | Oct. 2, 1928 |
| 1,755,804 | Barbarou | Apr. 22, 1930 |
| 1,795,386 | Beebe | Mar. 10, 1931 |
| 2,034,087 | Chilton | Mar. 17, 1936 |
| 2,069,408 | Forichon | Feb. 2, 1937 |
| 2,298,648 | Russell | Oct. 13, 1942 |
| 2,298,649 | Russell | Oct. 13, 1942 |
| 2,318,481 | Greenlee | May 4, 1943 |
| 2,348,763 | Syrory | May 16, 1944 |
| 2,349,410 | Normanville | May 23, 1944 |

FOREIGN PATENTS

| Number | Country | Date |
|---|---|---|
| 823,798 | France | Feb. 26, 1938 |